(12) United States Patent
Oh

(10) Patent No.: US 7,853,264 B1
(45) Date of Patent: Dec. 14, 2010

(54) METHOD AND SYSTEM FOR WIRELESS BACKHAUL COMMUNICATION BETWEEN A RADIO ACCESS NETWORK AND A REMOTE BASE STATION

(75) Inventor: Dae-Sik Oh, Overland Park, KS (US)

(73) Assignee: Sprint Spectrum L.P., Overland, KS (US)

( * ) Notice: Subject to any disclaimer, the term of this patent is extended or adjusted under 35 U.S.C. 154(b) by 400 days.

(21) Appl. No.: 11/283,565

(22) Filed: Nov. 18, 2005

(51) Int. Cl.
*H04W 72/00* (2009.01)

(52) U.S. Cl. .......................... 455/453; 455/82; 455/561; 455/560; 455/124

(58) Field of Classification Search .............. 455/562.1, 455/555, 82, 554, 561, 453, 452.2, 433, 560, 455/124

See application file for complete search history.

(56) References Cited

U.S. PATENT DOCUMENTS

| | | | |
|---|---|---|---|
| 6,175,737 B1 * | 1/2001 | Kao | 455/447 |
| 6,487,423 B1 * | 11/2002 | Johansson | 455/562.1 |
| 6,701,149 B1 * | 3/2004 | Sen et al. | 455/436 |
| 2002/0067707 A1 * | 6/2002 | Morales et al. | 370/331 |
| 2004/0001439 A1 * | 1/2004 | Jones | 370/235 |
| 2006/0262851 A1 * | 11/2006 | Bakfan et al. | 375/240.12 |

OTHER PUBLICATIONS

Bennet Wong, "Filling The Generation Gap With Software-Defined, Broadband Radio", CTI Where Datacom Meets Telecom, vol. 4, No. 9, uncovered at least as early as Jul. 2002.
"AirSite Backhaul Free Base Station", AirNet Communications Corporation, http://www.aircom.com/pr_airsite.htm, printed from the World Wide Web on Jun. 28, 2002.
Bennet Wong, "Eliminate the Backhaul Link", AirNet Communications Corporation, http://www.aircom.com/pn_feature.htm, printed from the World Wide Web on Jul. 1, 2002.
Bhanu Srinivas Valluri, "Spectral Efficient Technologies in 3G for Packet Access", http://www.techonline.com/community/ed_resource/feature_article/..., TechOnLine Publication Date Apr. 20, 2005.

* cited by examiner

*Primary Examiner*—Charles N Appiah
*Assistant Examiner*—Kwasi Karikar

(57) ABSTRACT

A mechanism for providing a wireless backhaul connection between a remote base transceiver station (BTS) and core radio access network (RAN) equipment such as a base station controller (BSC) for instance. The remote BTS will be provided with wireless server logic, such as a cell site modem (CSM), the RAN equipment will be provided with wireless client logic, such as a mobile station modem (MSM), and the wireless server logic of the remote BTS will be arranged to serve the wireless client logic of the RAN equipment with a packet-data connection for use to carry backhaul communications between the remote BTS and the RAN equipment. Advantageously, limited air interface resources of the core RAN equipment can thus be preserved for directly serving wireless client devices, as limited air interface resources of the wireless client logic at the remote BTS are instead (or in addition) allocated for the backhaul communication.

17 Claims, 2 Drawing Sheets

METHOD AND SYSTEM FOR WIRELESS BACKHAUL COMMUNICATION BETWEEN A RADIO ACCESS NETWORK AND A REMOTE BASE STATION

FIELD OF THE INVENTION

The present invention relates to wireless communications and more particularly to backhaul communications between a core radio access network and a remote base station.

DESCRIPTION OF RELATED ART

The art and popularity of wireless communications has grown significantly over recent years. Indeed, millions of people are now engaging in voice and data communications using wireless communication devices such as cellular telephones and personal digital assistants (PDAs). In principal, a user can communicate over the Internet or call anyone over the Public Switched Telephone Network (PSTN) from any place inside the coverage area of a cellular wireless network.

In a typical cellular wireless network, an area is divided geographically into a number of cells and cell sectors, each defined by a radio frequency (RF) radiation pattern from a respective base transceiver station (BTS). In a usual arrangement, each BTS includes directional antennas to produce three or more sectors. Multiple BTSs may then be coupled with a serving BSC, which may then be coupled with a telecommunications switch or gateway that provides connectivity with a transport network. For instance, a BSC may be coupled with a mobile switching center (MSC) that provides connectivity with the PSTN, and a BSC may be coupled with a packet data serving node (PDSN) that provides connectivity with a packet-switched network such as the Internet. Conveniently with this arrangement, when a wireless client device (WCD) is positioned within a given sector, the device can communicate with entities on the transport network via a communication path comprising the BTS, the BSC, the switch or gateway, and the transport network.

To provide a high quality of wireless communication service, it is desirable for wireless coverage areas such as cells and cell sectors to be adjacent to one another, leaving no intermediate gaps in which service is unavailable. Likewise, it is desirable to arrange each wireless coverage area such that its corresponding BTS has the capacity to handle all the communication sessions carried out by users at peak times within the coverage area. Thus, a central business district in which many wireless devices are used during the business day is typically provided with a higher density of base stations, each producing smaller coverage areas than would be provided in outlying areas.

One of the particular difficulties that a wireless carrier faces when designing a cellular wireless network is providing equipment and connections to serve remote areas, such as rural areas located at quite a distance from the carrier's core radio network equipment. In order to provide service in such an area, a wireless carrier would need to provide (or lease) a suitably positioned BTS. Yet, at issue is then how to connect that remotely located BTS to the carrier's other core network equipment, such as the serving BSC for instance.

Normally, a carrier would provide a T1 line or other landline backhaul connection respectively between a BSC and each BTS that the BSC serves. If the BTS is located quite a distance from its serving BSC, however, running such a landline backhaul connection could be very costly and difficult.

As an alternative, a wireless backhaul connection can be provided between the remotely located BTS and its serving BSC. To provide a wireless backhaul connection, a BTS ("serving BTS") that is located more closely to the BSC may be set to serve the remotely located BTS ("remote BTS") so as to establish a wireless packet-data connection between the remote BTS and the BSC, and the wireless packet-data connection can then be used as a backhaul link. Preferably, the wireless backhaul link would support high data rate communication, so that the remote BTS could theoretically serve multiple WCDs, and the wireless backhaul link could function as a wireless replacement for a T1 line or other landline backhaul link.

More particularly, to provide a wireless backhaul link between a BSC and a remote BTS, the remote BTS may be equipped with wireless client circuitry and logic much like that normally included in a WCD. For instance, the remote BTS may be equipped with a "mobile station modem" (MSM) chipset of the type available from Qualcomm Incorporated. Conventionally, the serving BTS may then include a "cell site modem" (CSM) chipset of the type also available from Qualcomm Incorporated, which functions to serve WCDs or more particularly MSMs. The remote BTS, serving BTS, and BSC may then be statically provisioned to establish a wireless packet-data link between the remote BTS and the BSC, much like how the BSC and the serving BTS would normally provide a wireless packet-data link for a conventional WCD. Yet the BSC would be arranged to treat communications with the remote BTS (MSM) as backhaul communications, just as the BSC would be arranged to treat communications over a T1 line linking the BSC with a BTS. Thus, the remote BTS may serve WCDs as normal, while engaging in wireless backhaul communication with its serving BSC.

SUMMARY

Unfortunately, with the wireless backhaul arrangement described above, valuable resources of the serving BTS will be used for purposes of serving the wireless packet-data connection for the remote BTS. In particular, the serving BTS may need to set aside one or more air interface traffic channels that the serving BTS might otherwise be able to assign to WCDs that the serving BTS itself directly serves. Although this reservation of resources is unlikely to cause a problem during periods of light load on the serving BTS, it can be particularly problematic when the load on the serving BTS is heavy, since the reservation of resources for use as a wireless backhaul link may prevent the serving BTS from being able to fully or satisfactorily serve WCDs directly.

Disclosed herein is a mechanism to help overcome this problem. As described more fully below, a remote BTS will itself be configured to serve a wireless backhaul link to the core radio network, such as to its serving BSC. In operation, the remote BTS will thus assign air interface resources to the core radio network, rather than (or in addition to) the core radio network assigning radio resources to the remote BTS, for use as the backhaul link. That way, valuable air interface resources of the core radio network, such a resources of the serving BTS as described above, could be preserved for use to directly serve WCDs, while air interface resources of the remote BTS could be allocated for use to serve the core radio network.

To implement this arrangement in practice, the remote BTS can include a CSM chipset or other wireless server module, and the core radio network can be equipped with an MSM chipset or other wireless client module, and the CSM of the remote BTS can be set to serve the MSM of the core radio network. The CSM of the remote BTS may be the same CSM that the remote BTS uses to directly serve WCDs, or it may be another CSM, such as one provided specifically for purposes of supporting backhaul communication. Preferably, the CSM of the remote BTS will assign at least one air interface traffic channel to the MSM of the core radio network, for use to carry wireless backhaul traffic (e.g., bearer and/or signaling traffic), and the MSM of the core radio network will thus be arranged to communicate with the remote BTS on the assigned air interface channel(s). At the core radio network, the MSM may be integrated in the serving BSC, or it may be otherwise communicatively linked with the serving BSC.

Accordingly, in one respect, an exemplary embodiment of the invention may take the form of a method of providing a wireless backhaul link between radio access network (RAN) equipment and a BTS located remotely from the RAN equipment, where the RAN equipment provides connectivity with a transport network. In particular, the method may involve (i) providing the RAN equipment with a wireless client module ("RAN client module," e.g., a CSM), (ii) providing the BTS with a wireless server module ("BTS server module," e.g., an MSM), and (iii) operating the BTS server module to serve the RAN client module, so as to establish a wireless packet-data connection between the BTS and the RAN equipment for use to carry backhaul communications between the BTS and the RAN equipment.

In this method, the RAN equipment may include a base station controller (BSC), and the function of providing the RAN equipment with the RAN client module may involve integrating the RAN client module in the BSC or communicatively linking the RAN client module with the BSC. Further, the function of operating the BTS server module to serve the RAN client module so as to establish the wireless packet-data connection may involve operating the BTS server module to assign at least one air interface traffic channel for use by the RAN client module. More particularly, the function may involve operating the BTS server module to assign both a forward link for backhaul communications from the BTS server module to the RAN client module and a reverse link for backhaul communications from the RAN client module to the BTS server module.

In another respect, the exemplary embodiment may take the form of a system that may include (i) RAN equipment communicatively linked with a transport network, (ii) a BTS located remotely from the RAN equipment, (iii) a wireless client module (e.g., an MSM) coupled with or integrated in the RAN equipment, and (iv) a wireless server module (e.g., a CSM) coupled with or integrated in the BTS. In this system, the wireless server assigns at least one air interface traffic channel to the wireless client module for use to carry backhaul communications between the BTS and the RAN equipment.

Similar to the method described above, the RAN equipment may include a BSC, and the wireless client module may be provided as a function of the BSC or may be connected to the BSC. Further, the wireless server module may serve one or more wireless client devices in the coverage of the BTS (in addition to, or including, serving the wireless client module that is coupled with or integrated in the RAN equipment). Alternatively, the BTS may include at least two wireless server modules, including one that assigns the at least one air interface traffic channel to the wireless client module (and thus serves the wireless client module) and another that serves one or more wireless client devices in coverage of the BTS.

The at least one air interface traffic channel that the wireless server module assigns to the wireless client module in accordance with this embodiment may include a forward link air interface traffic channel for use to carry backhaul communications from the BTS to the RAN equipment and a reverse link air interface traffic channel for use to carry backhaul communications from the RAN equipment to the BTS. Further, the at least one air interface traffic channel may comprise one or more traffic channels defined according to the well known 1xEV-DO and/or 1xRTT air interface protocols. In a more particular embodiment, the wireless server module may transmit a pilot signal, the wireless client module may receive the pilot signal and transmit a registration request, and wireless server module may receive the registration request and thereafter assign the at least one air interface traffic channel to the wireless client module.

In yet another respect, the exemplary embodiment may take the form of a system that includes (i) a BSC communicatively linked with a transport network, (ii) a first BTS communicatively linked with the BSC and having one or more antennas for radiating to define a wireless coverage area of the first BTS, (iii) a second BTS located remotely from the BSC and having one or more antennas for radiating to define a wireless coverage area of the second BTS, (iv) a CSM coupled with or integrated in the second BTS, and (v) an MSM coupled with or integrated in the BSC. As with the embodiments noted above, the CSM in this embodiment may be operable to assign at least one air interface traffic channel (e.g., a forward link and a reverse link) to the MSM, in this case for use to carry backhaul communications between the second BTS and the BSC.

Further, the CSM and MSM can be preset with one or more configuration parameters defining the air interface traffic channel assignment. Alternatively, the MSM may dynamically associate with the CSM and the CSM may then assign the one or more air interface traffic channels to establish the wireless backhaul link. In particular, as with the system noted above, the CSM may transmit a pilot signal, the MSM may receive the pilot signal and transmit a registration message to the CSM, and the CSM may thereafter assign the at least one air interface traffic channel to the MSM, to be used for backhaul communication.

These as well as other aspects, advantages, and alternatives will become more readily apparent to those of ordinary skill in the art by reading the following detailed description, with reference where appropriate to the accompanying drawings. Further, it should be understood that this summary and the description provided below are meant to illustrate the invention by way of example only, without limitation.

DETAILED DESCRIPTION

Figure 1:
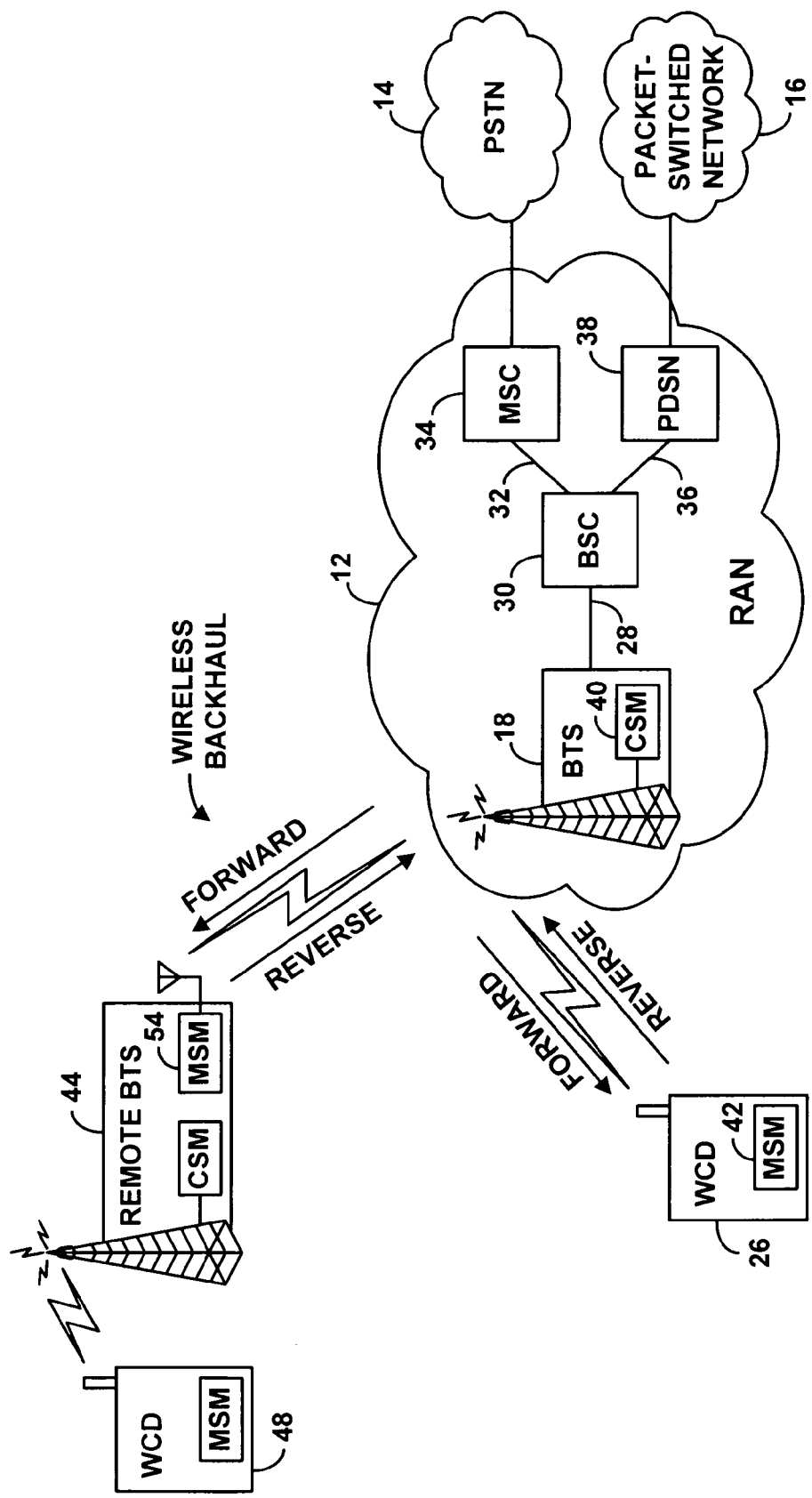
FIG. 1 is a simplified block diagram of a prior art wireless communication system.

Referring to the drawings, FIG. 1 is a block diagram depicting a prior art wireless communication system. As shown, the system includes at its core a radio access network (RAN) 12, which functions to provide connectivity between wireless client devices and one or more transport networks, such as the PSTN 14 and a packet-switched network (e.g., the Internet, or a private packet network) 16. RAN 12 conventionally includes a BTS 18 (including BTS antenna tower and BTS radio equipment), which radiates to define an air interface 24 through which the BTS communicates with wireless client devices. One wireless client device (WCD) (e.g., a cell phone, PDA, or other wirelessly-equipped device) 26 is shown by way of example; others could be provided as well.

As further shown, BTS 18 is coupled by a link 28 with a BSC 30 (also known in some implementations as a "radio network controller" (RNC)), which functions to control aspects of the BTS 18 as well as aspects of communication over the air interface 24. BSC 30 is then coupled by a link 32 with an MSC 34 that provides connectivity with PSTN 14, and BSC 30 is further coupled by a link 36 with a PDSN 38 that provides connectivity with the packet-switched network 16. With this general arrangement, WCD 26 may place and receive calls over PSTN 14 and engage in packet-data communications over network 16.

In general, air interface communications are divided into "forward link" communications passing from the RAN to wireless client devices, and "reverse link" communications passing from the wireless client devices to the RAN. These communications may take various forms, depending principally on the air interface protocol used by the RAN and the wireless client devices. Example air interface protocols include CDMA, TDMA, AMPS, and GSM, among others.

In practice, for instance, a BTS may be arranged to communicate on one or more carrier frequencies, typically using a pair of frequency bands to define the forward and reverse links respectively. The BTS may also include a set of directional antenna elements arranged to define multiple cell sectors. Communications in each sector on a given carrier frequency may then be distinguished from communications in other sectors by modulating the communications in the given sector with a sector-specific code, such as pseudo-random noise offset ("PN offset") for instance. Further, communications in each sector may be divided into control and traffic channels, each of which may be defined through modulation with one or more channel-based codes, or through time division multiplexing for instance. In a system operating according to the well known IS-856 (1xEV-DO) protocol, for example, forward-link communications in a given sector may time division multiplexed, while reverse-link communications may be carried in channels defined by "Walsh" codes.

For a number of reasons, each sector of a cellular communication system will typically have a limited quantity of air interface resources that the RAN must allocate among its various served client devices. By way of example, the BTS may have a limited amount of transmission power per sector that the BTS may need to divvy among forward link control and traffic channels. As another example, the BTS may have a limited number of traffic channel codes (e.g., Walsh codes) per sector that the BTS may need to allocate among its served devices. And as another example, in a TDM-based system, the BTS may have a limited number of traffic channel timeslots available to allocate among its served devices.

When a wireless client device seeks to engage in a transport network communication in a sector or moves into a sector while engaged in a transport network communication, the BTS serving the sector will need to devote some of its limited resources (if possible) to the communication. For example, the BTS may need to devote some of its transmission power and one or more traffic channels to the communication.

As a specific example, when WCD 26 seeks to place a PSTN call while in a given sector, the device may send a call origination request message over an air interface access channel to the RAN 12. To begin with, that use of the access channel constitutes a use of the limited BTS resources, since all devices operating in the same sector must typically share a common access channel or set of access channels. Next, upon receipt of the origination request message at the RAN 12, the BTS 18 and/or BSC 30 may then assign one of the sector's limited number of air interface traffic channels (e.g., particular Walsh code) for use by the device to engage in the call (or one on the forward link, and another on the reverse link), and the MSC 34 may work to connect the call over the PSTN 14. By definition, the assignment of a traffic channel to WCD 26 constitutes a further use of the limited BTS resources.

Similarly, when MSC 34 receives a request from PSTN 14 to connect a call to WCD 26, MSC 34 may instruct BSC 18 to page/alert WCD 26 over an air interface paging channel, which constitutes another use of the limited BTS resources. And the BTS 18 and/or BSC 30 may assign one of the sectors' air interface traffic channels for use by WCD 26 to engage in the call, which again by definition constitutes a further use of the limited BTS resources.

By the same token, when WCD 26 seeks to engage in packet-data communication, the device may send a packet-data origination message or a connection message over an air interface access channel to the RAN, which, like transmission of a call origination message, constitutes use of the limited BTS resources. Upon receipt of the packet-data origination message or connection message at the RAN, if the device does not yet have an assigned IP address, the BSC 30 may authenticate the device and then signal to the PDSN 38, the PDSN 38 may establish a data link layer connection with the WCD 26, and a mobile-IP home agent (not shown) may assign an IP address for use by the device to engage in packet-data communication.

Further, the BTS 18 and/or BSC 30 may assign an air interface traffic channel for use by the device to engage in packet-data communication, again constituting a further use of the limited BTS resources. In certain arrangements, the traffic channel assigned for packet-data communication may comprise a particular Walsh coded channel on the reverse link and a particular Walsh coded channel on the forward link, thus using some of the BTS's limited quantity of Walsh codes. In other arrangements, on the forward link, the assigned traffic channel may comprise dynamically scheduled TDM timeslots, thus using some of the BTS's limited quantity of timeslots.

To facilitate this general operation, as shown, BTS preferably includes CSM chipset 40 (i.e., any wireless server module, including but not limited to one of the "CSM" chipsets available from Qualcomm Incorporated), and WCD 26 preferably includes an MSM chipset 42 (i.e., any wireless client module, including but not limited to one of the "MSM" chipsets available from Qualcomm Incorporated). CSM chipset 40 and MSM chipset 42 are arranged in a known manner to provide a client-server relationship, with CSM 40 serving MSM 42 according to an agreed air interface protocol, such as one of those noted above.

In practice, CSM 40 may cause BTS 18 to emit a pilot signal in an associated sector of BTS 18, and MSM 42 may receive and detect that pilot signal. MSM 42 may then generate and send a registration message to CSM 40, to facilitate registration of device 26 in the RAN 12. Further, when WCD 26 places a call, control logic in WCD 26 may cause MSM 42 to generate the necessary call origination request message and to output the message for transmission over the air to RAN 12. CSM 40 may then receive and detect the call origination request message and process it accordingly. To support the requested call, CSM 40 may then further assign one or more air interface traffic channels to WCD 26, such as by sending a traffic channel assignment message over the air to device 26, which MSM 42 may then detect and respond to accordingly by beginning to communicate on the assigned traffic channel(s).

As further shown in FIG. 1, the prior art arrangement may additionally include a remote BTS 44 operable to serve a desired area, such as a rural area located remotely from the serving BSC. Like the other BTS 18 discussed above, this remote BTS 44 may include a BTS antenna tower and BTS radio equipment, and the remote BTS 44 may thus radiate to define an air interface 46 through which the remote BTS 44 communicates with wireless client devices. As with the other BTS, just one WCD 48 is shown in the coverage area of BTS 44, but others could be provided as well.

In order to serve wireless client devices, remote BTS 44, like the other BTS 18, preferably includes a CSM chipset 50 (i.e., any wireless server module), and each WCD such as WCD 48 preferably includes an MSM chipset 52 (i.e., any wireless client module). CSM chipset 50 and MSM chipset 52 are arranged in a known manner to provide a client-server relationship, with CSM 50 serving MSM 52 according to an agreed air interface protocol, such as one of those noted above. For instance, CSM 50 may serve MSM 52 in much the same manner that CSM 40 serves MSM 42.

Given the remote location of BTS 44, a wireless backhaul link may be established between the BSC 30 and the remote BTS 44. (A wireless backhaul link could just as well be established with BSC 30 and BTS 44 located more closely together. However, it would be most useful to provide a wireless backhaul link when the BSC and BTS are located quite a distance from each other, to avoid the expense of running a physical line to connect the two.)

In the existing art, to provide the wireless backhaul link, BTS 44 is further equipped with an MSM 54 (i.e., any wireless client module), and BSC 30 and BTS 18 are operable to serve a wireless packet data link on the MSM 54. The MSM 54 provided at BTS 44 may be much the same as an MSM conventionally included in a typical wireless communication device such as a cell phone, preferably equipped to support wireless packet-data communications.

In practice, when the BTS 44 is installed, it may use MSM 54 to programmatically acquire a wireless packet-data connection from RAN 12 in much the same way that WCD 26 might acquire a wireless packet-data connection from RAN 12. For instance, MSM 54 may detect a pilot signal emitted from BTS 18 and may send a registration request over the air to BTS 18, which BTS 18 may pass along to BSC 30. Based on an MSM identifier (e.g., MDN, NAI, or the like) of MSM 54, BSC 30 may detect that the registration request is one of a remote BTS. Upon acknowledgement of its registration, BTS 44 may then send a packet-data origination request or connection request to BTS 18, which BTS 18 may pass along to BSC 30. MSM 54 may thereby acquire a data link and IP address if it does not have a data link and IP address already, and BSC 30 and/or BTS 18 may assign one or more air interface traffic channels for use by MSM 54 as a backhaul link. As noted above, for instance, the assigned traffic channel(s) may comprise one or more Walsh coded channels and/or one or more timeslots.

Once the wireless backhaul link is in place, remote BTS 44 may serve wireless client devices such as WCD 48, while engaging in wireless backhaul communication with BSC 30. A device such as WCD 48 may thereby engage in communication on PSTN 14 or packet-switched network 16 in much the same way as a device such as WCD 26 would. Preferably, the fact that a wireless backhaul link is used would be transparent to a user of WCD 48.

In an alternative arrangement, in theory, BSC 30, BTS 18, and remote BTS 44 could be pre-configured with one or more operational parameters to establish the requisite wireless backhaul connection. For instance, through engineering design, (i) the MSM 54 of remote BTS 44 could be pre-programmed to use a particular one of the air interface traffic channels allocable by the CSM 40 of BTS 18, (ii) the CSM 40 of BTS 18 could be pre-programmed with at particular air interface traffic channel reserved for use by the MSM 54 of BTS 44, and (iii) the BSC 30 could be pre-programmed to treat all communications with MSM 54 (i.e., with BTS 44) as backhaul communications, just as the BSC 30 is programmed to treat all communications over link 28 with BTS 18 as backhaul communications.

As the foregoing illustrates, in order to provide the wireless backhaul link between BSC 30 and BTS 44, valuable air interface resources of BTS 18 (such as power, access channel, paging channel, and traffic channel resources) are used. As explained above, this use of air interface resources to support backhaul communications may reduce the quantity of air interface resources that remain for use to directly serve wireless client devices. For instance, by reserving some of its limited air interface resources to serve remote BTS 44, core BTS 18 may have fewer resources available to directly serve WCD 26. Consequently, WCD 26 may suffer from reduced quality of communication or, in a worst case, may be prevented altogether from communicating.

Figure 2:
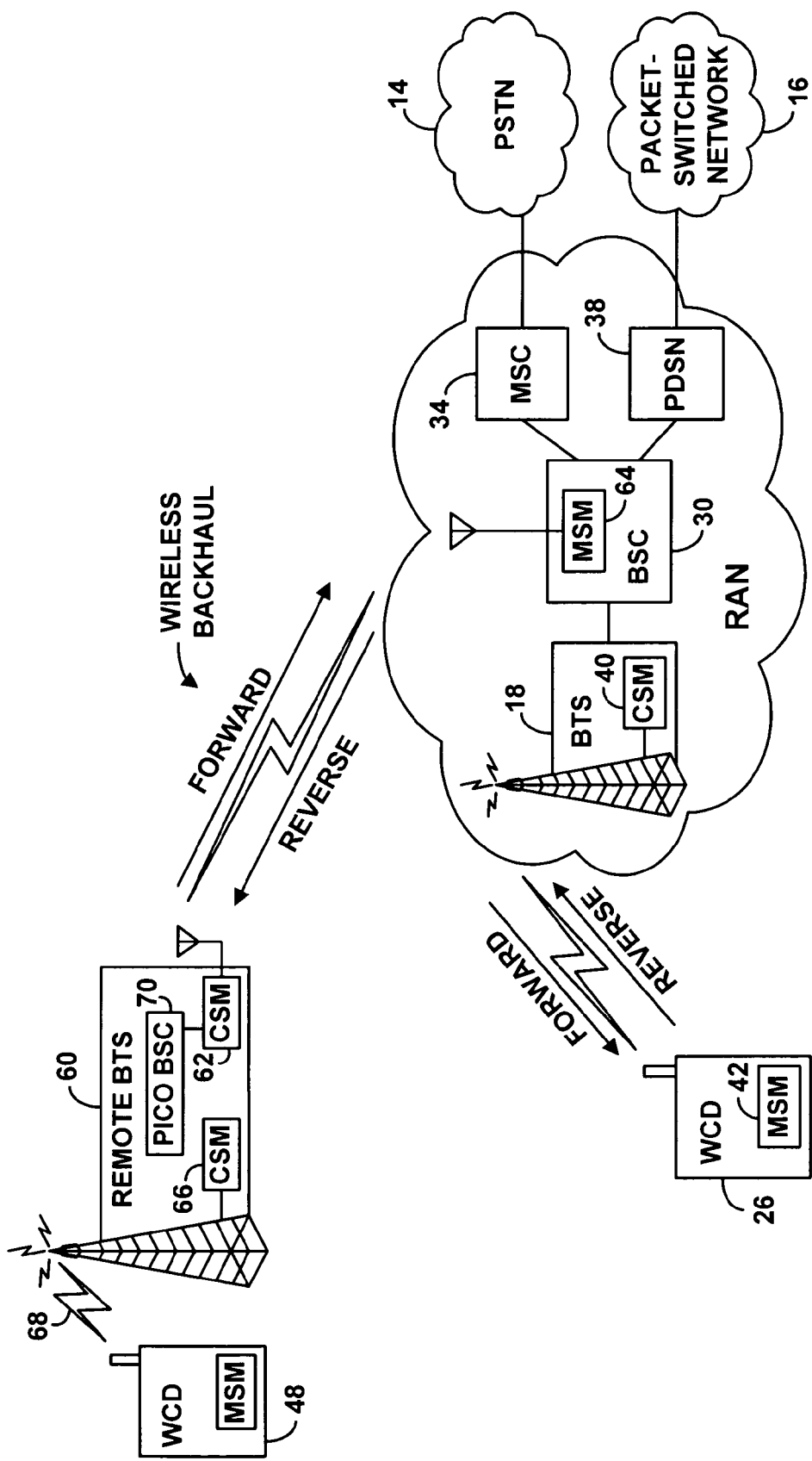
FIG. 2 is a simplified block diagram of a wireless communication system arranged in accordance with an exemplary embodiment of the present invention.

FIG. 2 illustrates a variation of the arrangement of FIG. 1, configured to help overcome this problem in accordance with an exemplary embodiment of the present invention. In the arrangement of FIG. 2, a remote BTS 60 is provided with a CSM 62 (i.e., any wireless server module), the core RAN 12 is provided with an MSM 64 (i.e., any wireless client module), and the CSM 62 of the remote BTS 60 is set to serve the MSM 64 of the RAN 12 with a wireless packet data connection to use for backhaul communications. With this inventive arrangement, as described above, backhaul communication is provided by using some of the limited air interface resources allocable by the CSM 62 of the remote BTS 60, rather than (or in addition to) using some of the limited air interface resources allocable by the CSM 40 of the core BTS 18. Thus, if the core BTS 18 needs to serve other wireless devices, such as WCD 26, its air interface resources could be preserved for at least that purpose.

As further shown in FIG. 2, remote BTS 60 may include two or more CSMs, including (i) the CSM 62 set to serve the MSM 64 of the RAN and (ii) a CSM 66 set to serve wireless client devices such as WCD 48 over an air interface 68. Alternatively, remote BTS 60 could include just a single CSM that is arranged to both (a) serve the MSM 64 of the RAN and (ii) serve wireless client devices such as WCD 48. In that case, some of the limited air interface resources that the CSM could allocate for use to serve wireless client devices such as WCD 48 would be set aside for use to serve the MSM 64 of the RAN. However, if remote BTS 60 is located in a rural area or other location where usage is light, this is expected to not present a problem.

In either case, CSM 62 would preferably include or be coupled with one or more antennas through which CSM 62 can engage in air interface communication with the MSM 64 at RAN 12. In one arrangement, the antenna(s) could be provided specifically in order to support wireless backhaul communication. In another embodiment, the antenna(s) could be the same antenna(s) that the remote BTS 60 would normally use to server wireless client devices such as WCD 48.

As additionally shown, remote BTS 60 may include a pico BSC function 70 coupled with CSM 62, to facilitate controllably serving the MSM 64 of RAN 12 with a wireless packet-data backhaul connection. Pico BSC function 70 may function with respect to CSM 62 in much the same way as BSC 30 functions with respect to the CSM 40 of BTS 18. That is, pico BSC function 70 may function to control aspects of CSM 62 and aspects of communication over the air interface between CSM 62 and MSM 64.

Note that CSM 62 and/or the associated pico BSC function 70 could be provided at remote BTS 60 in various ways. In one embodiment as shown, for instance, these functional elements could be integrated in the BTS 60 itself. For example, BTS 60 may integrally include the CSM 62 in the form of a CSM chipset of the type available from Qualcomm Incorporated, perhaps with associated control logic (e.g., program logic executable by a processor of BTS 60). And BTS 60 may further integrally include program logic (e.g., also executable by a processor) that defines any and all functions of the pico BSC to facilitate control of CSM 62 and further management of the air interface between the remote BTS 60 and the RAN 12.

In another embodiment (not shown), either or both of these functional elements could be located external to the BTS 60 and could be communicatively linked (e.g. by a cable) with the BTS 60. For instance, an adjunct module could be provided primarily (or only) for the purpose of establishing the wireless backhaul link between BTS 60 and the RAN 12. The adjunct module could include the CSM 62 for serving the MSM 64 of the RAN 12 and could further include the pico BSC function 70 for control purposes. The adjunct module may then be coupled by a line (e.g., a T1 line) with the BTS 60 in much the same way that a BSC might normally be coupled directly with a BTS.

MSM 64 can be provided at RAN 12 in various ways as well. Generally speaking, MSM 64 will be provided in a way that enables BSC 30 and/or other equipment of RAN 12 (e.g., MSC 34) to engage in backhaul communication with remote BTS 60 via MSM 64. Thus, MSM 64 will preferably be communicatively linked in some manner with BSC 30 and/or with other RAN equipment.

In one exemplary embodiment as shown in FIG. 2, MSM 64 may be provided as an integral component of BSC 30. For instance, BSC 30 may contain an MSM chipset of the type available from Qualcomm Incorporated, perhaps with associated control logic (e.g., program logic executable by a processor of BSC 30), cooperatively defining MSM 64. Alternatively (not shown), the MSM 64 may be provided externally to the BSC 30, such as in an adjunct device that is coupled with the BSC 30, in much the same way as a BTS is normally coupled with a BSC. As further shown, MSM 64 would include or be coupled with one or more antennas through which the MSM 64 may engage in air interface communication with the CSM 62 at the remote BTS 60 (perhaps via one or more repeaters or other intermediate elements).

As a general matter, the wireless backhaul connection provided between CSM 62 (and perhaps pico BSC 70) at the remote BTS 60 and MSM 64 at the RAN 12 may be largely transparent to the core operation of remote BTS 60 and BSC 30. At the remote BTS 60, the CSM 62 (perhaps with pico BSC 70) may provide for wireless backhaul communication with the RAN 12, and may interface with the remote BTS 60 in much the same way that a T1 connection with a BSC would normally interface with a BTS. At the RAN 12, the MSM 64 may provide for wireless backhaul communication with the remote BTS 60 in much the same way that a T1 connection with a BTS would normally interface with a BSC. Thus, BSC 30 and remote BTS 60 may operate in a largely conventional manner, notwithstanding the fact that they communicate with each other over a wireless backhaul connection.

As noted above, in accordance with the exemplary embodiment, CSM 62 at remote BTS 60 (preferably with pico BSC 70) will serve MSM 64 with a wireless packet-data connection for use to carry backhaul communications (e.g., signaling and bearer traffic) between remote BTS 60 and RAN 12. Preferably, the wireless packet data connection will be a high data rate connection, such as one provided according to the well known 1xEV-DO air interface protocol for instance. However, the wireless packet-data connection could be provided according to one or more other air interface protocols now known or later developed (such as the well known 1xRTT protocol, for instance.)

Thus, in exemplary operation, CSM 62 at remote BTS 60 may emit a pilot signal on a particular PN offset once BTS 60 is powered on. (The PN offset could be the same as one used by the core BTS 18, possibly shifted by some number of chips for instance.) MSM 64 at RAN 12 may then receive and detect the pilot signal and send a registration message over the air to CSM 62. CSM 62 may then locally record the presence of MSM 64 and send any necessary registration acknowledgement over the air to the MSM 64 at the RAN.

MSM 64 may then (or as the process of registration) programmatically work with CSM 62 to establish a wireless packet-data connection. For instance, MSM 64 may over the air to CSM 62 a Universal Access Terminal Identifier (UATI) request, and CSM 62 may send a response to MSM 64 directing MSM 64 to use a particular International Mobile Station Identifier (IMSI) in subsequent communications with CSM 62. MSM 64 may then send a connection-request to the CSM 62, and the CSM 62 may responsively establish a data link layer connection (e.g., point-to-point protocol session) with MSM 64 and assign an IP address to MSM 64. MSM 64 may communicate with CSM 62 to establish the data link layer connection and receive an IP address assignment in much the same way that an MSM would normally communicate with a PDSN to do so; in that case, CSM 62 may programmatically emulate the functions of the PDSN. Alternatively, MSM 64 and CSM 62 may be pre-set with the necessary operational parameters (e.g., a static IP address of MSM 64, etc.)

CSM 62 will then preferably assign air interface resources for use to carry backhaul communications between remote BTS 60 and RAN 12. For instance, CSM 62 may send message to MSM 64 directing MSM 64 to use one or more particular Walsh codes for communicating on the reverse link (from the MSM 64 to the CSM 62), and CSM 62 may allocate various forward link timeslots for use to carry backhaul communications to MSM 64. With conventional 1xEV-DO operation, a base station applies a scheduling algorithm to divvy the forward link timeslots among various served wireless client devices. In this case, if MSM 64 is the only wireless client device served by CSM 62, CSM 62 may programmatically devote all of its forward link timeslots (i.e., the bearer data portions of such timeslots) for use to engage in backhaul communication with MSM 64. Alternatively, if CSM 62 also serves one or more other wireless client devices, such as WCD 48 for instance, CSM 62 may apply a 1xEV-DO scheduling algorithm to allocate its available forward link timeslots to all of the served wireless client devices, including MSM 64.

In resulting operation, WCD 48 may communicate with entities on a transport network such as PSTN 14 or packet-switched network via a communication path comprising (i) the air interface between WCD 48 and remote BTS 60, (ii) the air interface between CSM 62 at remote BTS 60 and MSM 64 at RAN 12, and (iii) the communication link between BSC 30 and the transport network.

For example, to place a PSTN call, WCD 48 may send a call origination message to remote BTS 60, and CSM 62 may send the call origination message in packetized format over the wireless backhaul link to MSM 64 at the RAN 12. MSM 64 may then receive and depacketize the call origination message, and the BSC 30 receive and process the message, typically passing it along to MSC 34. As MSC 34 works to set up the call over PSTN, BSC 30 may direct remote BTS 60 to assign a traffic channel for use by WCD 48 to engage in the call, by sending a control message, which MSM 64 would packetize and send to over the wireless backhaul link to CSM 62. Upon receipt of the directive from BSC 30, remote BTS 60 may then assign an air interface traffic channel for use by WCD 48 to engage in the call. Upon connection of the call, the call may then proceed via remote BTS 60, the wireless backhaul link, and RAN 12.

Exemplary embodiments of the present invention has been described above. Those of ordinary skill in the art will appreciate that modifications can be made to these embodiments without deviating from the true scope and spirit of the invention, which is defined by the claims.

What is claimed is:

1. A method of providing a wireless backhaul link between radio access network (RAN) equipment and a base transceiver station (BTS) located remotely from the RAN equipment, wherein the RAN equipment provides connectivity with a transport network, the method comprising:
    providing the RAN equipment with a wireless client module ("RAN client module");
    providing the BTS with a wireless server module ("BTS server module"); and
    operating the BTS server module to serve the RAN client module, so as to establish a wireless packet-data connection between the BTS and the RAN equipment for use to carry backhaul communications between the BTS and the RAN equipment,
    wherein operating the BTS server module to serve the RAN client module, so as to establish a wireless packet-data connection between the BTS and the RAN equipment for use to carry backhaul communications between the BTS and the RAN equipment, comprises operating the BTS server module to assign at least one air interface traffic channel for use by the RAN client module.

2. The method of claim 1, wherein the RAN equipment includes a base station controller (BSC), and wherein providing the RAN equipment with the RAN client module comprises integrating the RAN client module in the BSC.

3. The method of claim 1, wherein the RAN equipment includes a base station controller (BSC), and wherein providing the RAN equipment with the RAN client module comprises communicatively linking the RAN client module with the BSC.

4. The method of claim 1, wherein the BTS server module comprises a cell site modem (CSM), and wherein the RAN client module comprises a mobile station modem (MSM).

5. The method of claim 1, wherein operating the BTS server module to assign at least one air interface traffic channel for use by the RAN client module comprises:
    operating the BTS server module to assign a forward link air interface traffic channel for carrying backhaul communications from the BTS server module to the RAN client module; and
    operating the BTS server module to assign a reverse link air interface traffic channel for carrying backhaul communications from the RAN client module to the BTS server module.

6. A system comprising:
    radio access network (RAN) equipment communicatively linked with a transport network;
    a base transceiver station (BTS) located remotely from the RAN equipment;
    a wireless client module at the RAN equipment; and
    a wireless server module at the BTS,
    wherein the wireless server module assigns at least one air interface traffic channel to the wireless client module for use to carry backhaul communications between the BTS and the RAN equipment,
    wherein the at least one air interface traffic channel comprises (i) a forward link air interface traffic channel for use to carry backhaul communications from the BTS to the RAN equipment and (ii) a reverse link air interface traffic channel for use to carry backhaul communications from the RAN equipment to the BTS.

7. The system of claim 6, wherein the RAN equipment comprises a base station controller (BSC), and wherein the wireless client module is provided as a function of the BSC.

8. The system of claim 6, wherein the RAN equipment comprises a base station controller (BSC), and wherein the wireless client module is connected to the BSC.

9. The system claim 6, wherein the wireless server module further serves one or more wireless client devices in coverage of the BTS.

10. The system of claim 6, wherein the wireless client module comprises a mobile station modem (MSM), and the wireless server module comprises a cell site modem (CSM).

11. The system of claim 6, wherein the at least one air interface traffic channel comprises a 1xEV-DO traffic channel.

12. The system of claim 6, wherein the at least one air interface traffic channel comprises a 1xRTT traffic channel.

13. A system comprising:
    a base station controller (BSC) communicatively linked with a transport network;
    a first base transceiver station (BTS) communicatively linked with the BSC, the first BTS including one or more antennas for radiating to define a wireless coverage area of the first BTS;
    a second BTS located remotely from the BSC, the second BTS including one or more antennas for radiating to define a wireless coverage area of the second BTS;
    a cell site modem (CSM) at the second BTS; and
    a mobile station modem (MSM) at the BSC;
    wherein the CSM is operable to assign at least one air interface traffic channel to the MSM, for use to carry backhaul communications between the second BTS and the BSC,
    wherein the at least one air interface traffic channel comprises (i) a forward link air interface traffic channel for use to carry backhaul communications from the BTS to the BSC and (ii) a reverse link air interface traffic channel for use to carry backhaul communications from the BSC to the BTS.

14. A system comprising:
    a base station controller (BSC) communicatively linked with a transport network;
    a first base transceiver station (BTS) communicatively linked with the BSC, the first BTS including one or more antennas for radiating to define a wireless coverage area of the first BTS;
    a second BTS located remotely from the BSC, the second BTS including one or more antennas for radiating to define a wireless coverage area of the second BTS;

a cell site modem (CSM) at the second BTS; and
a mobile station modem (MSM) at the BSC;
wherein the CSM is operable to assign at least one air interface traffic channel to the MSM, for use to carry backhaul communications between the second BTS and the BSC,
wherein the CSM and MSM are pre-set with one or more configuration parameters defining an assignment of the at least one air interface traffic channel.

15. A system comprising:
a base station controller (BSC) communicatively linked with a transport network;
a first base transceiver station (BTS) communicatively linked with the BSC, the first BTS including one or more antennas for radiating to define a wireless coverage area of the first BTS;
a second BTS located remotely from the BSC, the second BTS including one or more antennas for radiating to define a wireless coverage area of the second BTS;
a cell site modem (CSM) at the second BTS; and
a mobile station modem (MSM) at the BSC;
wherein the CSM is operable to assign at least one air interface traffic channel to the MSM, for use to carry backhaul communications between the second BTS and the BSC,
wherein the CSM transmits a pilot signal, the MSM receives the pilot signal and transmits a registration message to the CSM, and the CSM thereafter assigns the at least one air interface traffic channel to the MSM.

16. A system comprising:
radio access network (RAN) equipment communicatively linked with a transport network;
a base transceiver station (BTS) located remotely from the RAN equipment;
a wireless client module at the RAN equipment; and
a wireless server module at the BTS,
wherein the wireless server module assigns at least one air interface traffic channel to the wireless client module for use to carry backhaul communications between the BTS and the RAN equipment,
wherein the BTS includes at least two wireless server modules, including (i) the wireless server module that assigns the at least one air interface traffic channel to the wireless client module and (ii) another wireless server module that serves one or more wireless client devices in coverage of the BTS.

17. A system comprising:
radio access network (RAN) equipment communicatively linked with a transport network;
a base transceiver station (BTS) located remotely from the RAN equipment;
a wireless client module at the RAN equipment; and
a wireless server module at the BTS,
wherein the wireless server module assigns at least one air interface traffic channel to the wireless client module for use to carry backhaul communications between the BTS and the RAN equipment,
wherein the wireless server module transmits a pilot signal, the wireless client module receives the pilot signal and transmits a registration request, and the wireless server module receives the registration request and thereafter assigns the at least one air interface traffic channel.

* * * * *